(12) United States Patent
Yang et al.

(10) Patent No.: US 11,537,168 B2
(45) Date of Patent: *Dec. 27, 2022

(54) DISPLAY APPARATUS

(71) Applicant: Acer Incorporated, New Taipei (TW)

(72) Inventors: Yi-Hsuan Yang, New Taipei (TW);
Wu-Chen Lee, New Taipei (TW);
Cheng-Nan Ling, New Taipei (TW);
Chia-Bo Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,098

(22) Filed: Nov. 30, 2021

(65) Prior Publication Data

US 2022/0083104 A1 Mar. 17, 2022

Related U.S. Application Data

(63) Continuation of application No. 17/087,625, filed on Nov. 3, 2020, now Pat. No. 11,226,657.

(30) Foreign Application Priority Data

May 27, 2020 (TW) .................................. 109117645

(51) Int. Cl.
*G06F 1/16* (2006.01)
(52) U.S. Cl.
CPC .......... *G06F 1/1654* (2013.01); *G06F 1/1647* (2013.01); *G06F 1/165* (2013.01); *G06F 1/1607* (2013.01); *G06F 1/1641* (2013.01); *G06F 1/1649* (2013.01)

(58) Field of Classification Search
CPC ...... G06F 1/1647; G06F 1/1649; G06F 1/165; G06F 1/1654; G06F 1/1641
See application file for complete search history.

(56) References Cited

U.S. PATENT DOCUMENTS

| | | | | |
|---|---|---|---|---|
| 5,144,290 A | * | 9/1992 | Honda | G06F 1/1683 345/905 |
| 9,047,049 B2 | * | 6/2015 | Yang | G06F 1/1626 |
| 9,256,255 B2 | * | 2/2016 | Chang | G06F 1/1632 |
| 9,535,466 B2 | * | 1/2017 | Chang | G06F 1/1683 |
| 9,645,608 B1 | * | 5/2017 | Tsai | G06F 1/1632 |
| 9,910,455 B1 | * | 3/2018 | Morrison | G06F 1/1654 |
| 10,732,673 B2 | * | 8/2020 | Mori | G06F 1/1632 |

(Continued)

*Primary Examiner* — Nidhi Thaker
(74) *Attorney, Agent, or Firm* — JCIPRNET (57) ABSTRACT

A display apparatus includes a first display and a second display. The first display includes a first display body having a first side, a positioning recess located at the first side, and an engagement recess located in the positioning recess. The second display is detachably mounted at one side of the first display body, includes a second display body, a positioning protrusion, and a pendulum hook, and has a second side. The positioning protrusion is connected to the second side and has a cavity configured to accommodate the pendulum hook pivotally connected to the positioning protrusion and including an engagement protrusion. The positioning protrusion is inserted into the positioning recess. The second side contacts the first side. The engagement protrusion is configured to move out of the cavity and be engaged with the engagement recess or move away from the engagement recess and move back to the cavity.

10 Claims, 8 Drawing Sheets

(56) References Cited

U.S. PATENT DOCUMENTS

| | | | | |
|---|---|---|---|---|
| 2003/0161094 A1* | 8/2003 | Chambers | ............ | G06F 1/1616 |
| | | | | 361/679.04 |
| 2012/0256929 A1* | 10/2012 | Koenig | .................. | G09G 5/00 |
| | | | | 345/503 |
| 2014/0133080 A1* | 5/2014 | Hwang | ................ | G06F 1/1654 |
| | | | | 361/679.17 |
| 2017/0023977 A1* | 1/2017 | Xin | ...................... | G06F 1/1647 |
| 2021/0080999 A1* | 3/2021 | Bryant | ................ | G06F 1/1641 |

\* cited by examiner

DISPLAY APPARATUS

CROSS-REFERENCE TO RELATED APPLICATION

This application is a continuation application of and claims the priority benefit of U.S. application Ser. No. 17/087,625, filed on Nov. 13, 2020, now allowed, which claims the priority benefit of Taiwan application serial no. 109117645, filed on May 27, 2020. The entirety of each of the above-mentioned patent applications is hereby incorporated by reference herein and made a part of this specification.

BACKGROUND

Technical Field

The disclosure relates to a display apparatus, and in particular, is related to a display apparatus including at least two displays.

Description of Related Art

Nowadays, notebook computers have become an indispensable tool for people owing to several features including multitasking, high computing efficiency, and portability. Generally, a notebook computer is provided with a single display. However, as diverse needs from users grow, multi-display designs are provided to meet users' needs. In an existing multi-display integration design, a sub-display is provided with a pivoting mechanism, a sliding mechanism, or a combination of the foregoing to be connected to the main display. In one operation mode, the sub-display may be accommodated at the back side or an internal accommodation space of the main display. In another operation mode, the sub-display may move with respect to the main display and moves to the lateral side of the main display, and in this way, an expanded screen size or picture-in-picture displaying is accordingly provided.

Nevertheless, the aforementioned multi-display integration design may not allow a user to freely disassemble and assemble the displays and does not allow the user to conveniently carry the displays around either owing to considerable thicknesses and weights of the displays.

SUMMARY

The disclosure provides a display apparatus which exhibits good reliability and may be disassembled and assembled conveniently.

The disclosure provides a display apparatus including a first display and a second display. The first display includes a first display body, and the first display body has a first side, a positioning recess located at the first side, and an engagement recess located in the positioning recess. The second display is detachably mounted at one side of the first display body. The second display includes a second display body, a positioning protrusion, and a pendulum hook, and the second display body has a second side. The positioning protrusion is connected to the second side, and the positioning protrusion has a cavity configured to accommodate the pendulum hook. The pendulum hook is pivotally connected to the positioning protrusion. The pendulum hook has an engagement protrusion. The positioning protrusion is inserted into the positioning recess, and the second side of the second display body contacts the first side of the first display body. The engagement protrusion of the pendulum hook is configured to move out of the cavity and be engaged with the engagement recess or move away from the engagement recess and move back to the cavity.

To sum up, in the display apparatus provided by the disclosure, as the positioning protrusion is matched with the positioning recess, the second display may be mounted at one side of the first display by the user, and the second display is also prevented from being slidably detached from the first display. Further, after the positioning protrusion is inserted into the positioning recess, and the second side of the second display body contacts the first side of the first display body. When the pendulum hook is subjected to the action of gravity so that engagement protrusion is engaged with the engagement recess, structural interference is generated between the engagement protrusion and the engagement recess, so that the second display is accordingly prevented from being detached from the first display, and assembly reliability of the display apparatus is enhanced. In contrast, when the pendulum hook is subjected to the action of gravity so that the engagement protrusion moves out of the engagement recess, the structural interference between the engagement protrusion and the engagement recess is lifted, and that the second display may be detached from the first display by the user, and easy detaching and mounting is provided.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
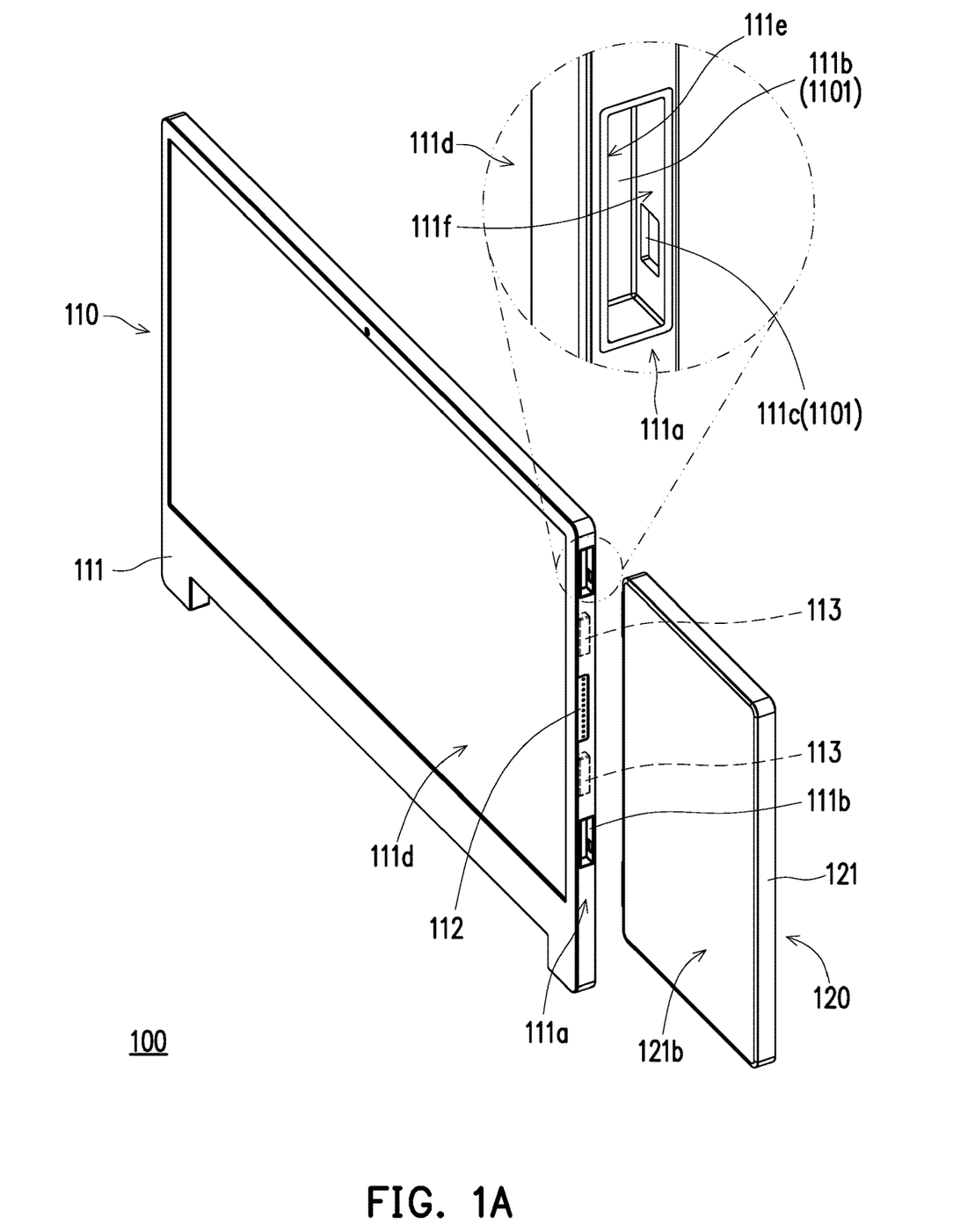
FIG. 1A is a schematic exploded view of a display apparatus according to an embodiment of the disclosure.
Figure 1B:
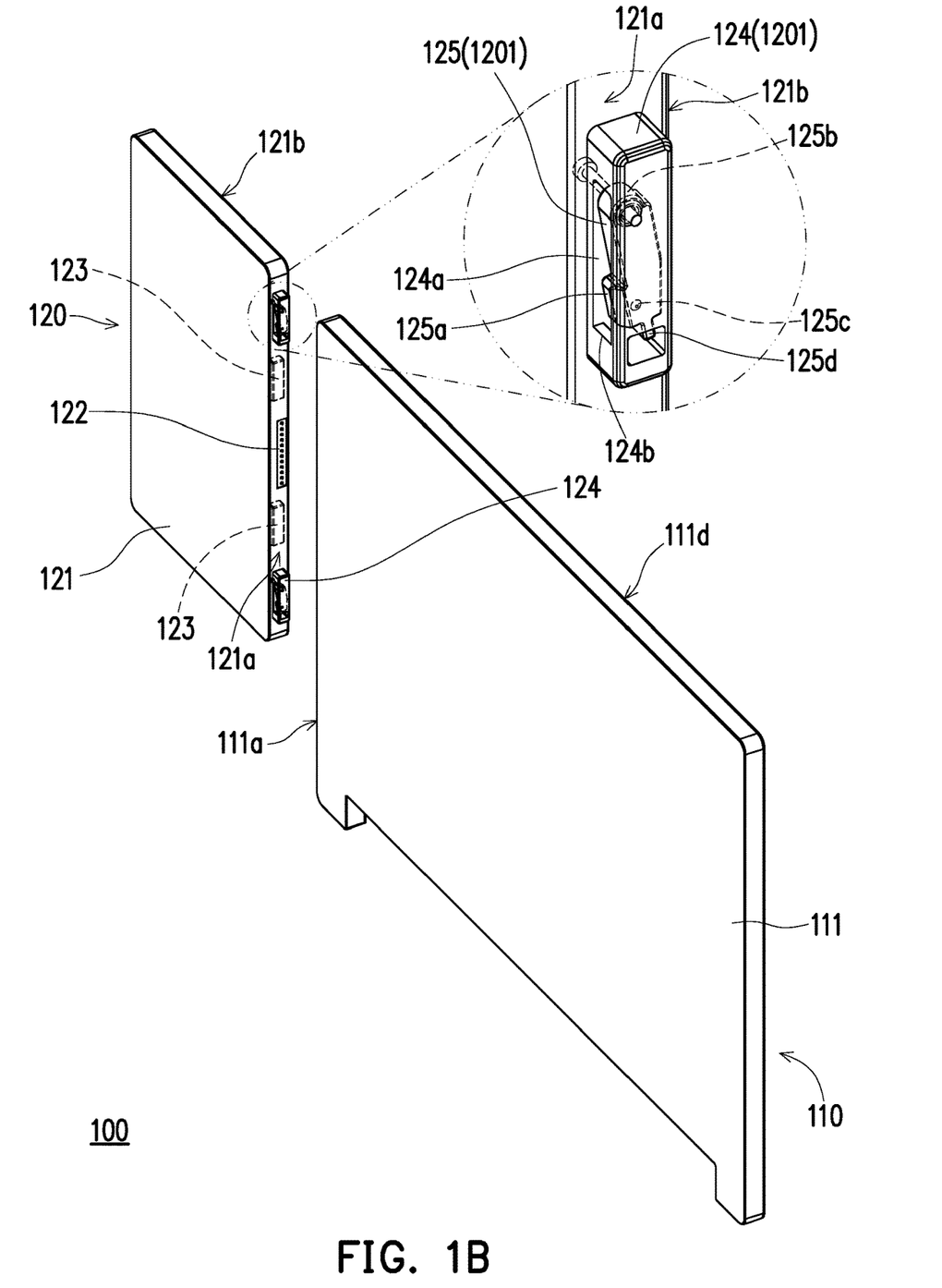
FIG. 1B is a schematic exploded view of the display apparatus of FIG. 1A from another viewing angle.

FIG. 1A is a schematic exploded view of a display apparatus according to an embodiment of the disclosure. FIG. 1B is a schematic exploded view of the display apparatus of FIG. 1A from another viewing angle. With reference to FIG. 1A and FIG. 1B, in this embodiment, a display apparatus 100 includes a first display 110 and a second display 120. The first display 110 may be a main display interface of a notebook computer and is pivotally connected to a host of the notebook computer. On the other hand, the second display 120 acts as an external display interface and is configured to be mounted at one side of the first display 110, so that an expanded screen size or picture-in-picture displaying is accordingly provided. In states shown in FIG. 1A and FIG. 1B, the second display 120 is detached from the first display 110 to be conveniently carried by a user.

As shown in FIG. 1A, the first display 110 includes a first display body 111, a first connector 112, and a first magnet 113. The first display body 111 has a first side 111*a*, a positioning recess 111*b* located at the first side 111*a*, and an engagement recess 111*c* located in the positioning recess 111*b*. The first magnet 113 corresponds to the first side 111*a* and is disposed in the first display body 111. A number of the positioning recess 111*b* may be two, and each positioning recess 111*b* is correspondingly provided with one engagement recess 111*c*. That is, each positioning recess 111*b* and one engagement recess 111*c* are arranged into a group and form a first positioning group 1101. A number of the first magnet 113 may be two, and the first magnets 113 are located between the two positioning recesses 111*b*. Further, the first connector 112 may be a female connector, and the first connector 112 is disposed at the first side 111*a* and is located between the two first magnets 113.

Note that the numbers of the first magnet 113, the positioning recess 111*b*, and the engagement recess 111*c* may be increased or decreased according to actual needs and are not limited by the disclosure.

As shown in FIG. 1B, the second display 120 includes a second display body 121, a second connector 122, a second magnet 123, a positioning protrusion 124, and a pendulum hook 125. The second display body 121 has a second side 121*a* corresponding to the first side 111*a*, and the second magnet 123 corresponds to the second side 121*a* and is disposed in the second display body 121. The positioning protrusion 124 is connected to or protrudes from the second side 121*a*. A number of the positioning protrusion 124 may be two, and each positioning protrusion 124 is correspondingly provided with one pendulum hook 125. That is, each positioning protrusion 124 and one pendulum hook 125 are arranged into a group and form a second positioning group 1201. A number of the second magnet 123 may be two, and the second magnets 123 are located between the two positioning protrusions 124. Further, the second connector 122 may be a male connector, and the second connector 122 is disposed at the second side 121*a* and is located between the two second magnets 123.

Note that the numbers of the second magnet 123, the positioning protrusion 124, and the pendulum hook 125 may be increased or decreased according to actual needs and are not limited by the disclosure.

As shown in FIG. 1B, each positioning protrusion 124 has a cavity 124*a* configured to accommodate the pendulum hook 125. The pendulum hook 125 is pivotally connected to the positioning protrusion 124 to rotate (or swing) with respect to the positioning protrusion 124 under the action of gravity. As shown in FIG. 1A and FIG. 1B, each second positioning group 1201 and one first positioning group 1101 are correspondingly arranged and are matched. To be specific, each pendulum hook 125 has an engagement protrusion 125*a* matched with the corresponding engagement recess 111*c*. In the state shown in FIG. 1B, each engagement protrusion 125*a* is held in the corresponding cavity 124*a*.

As shown in FIG. 1A and FIG. 1B, when each engagement protrusion 125*a* is held in the corresponding cavity 124*a*, each positioning protrusion 124 may be smoothly inserted into the corresponding positioning recess 111*b*, and that the second display 120 may be mounted at one side of the first display 110.

Figure 2A:
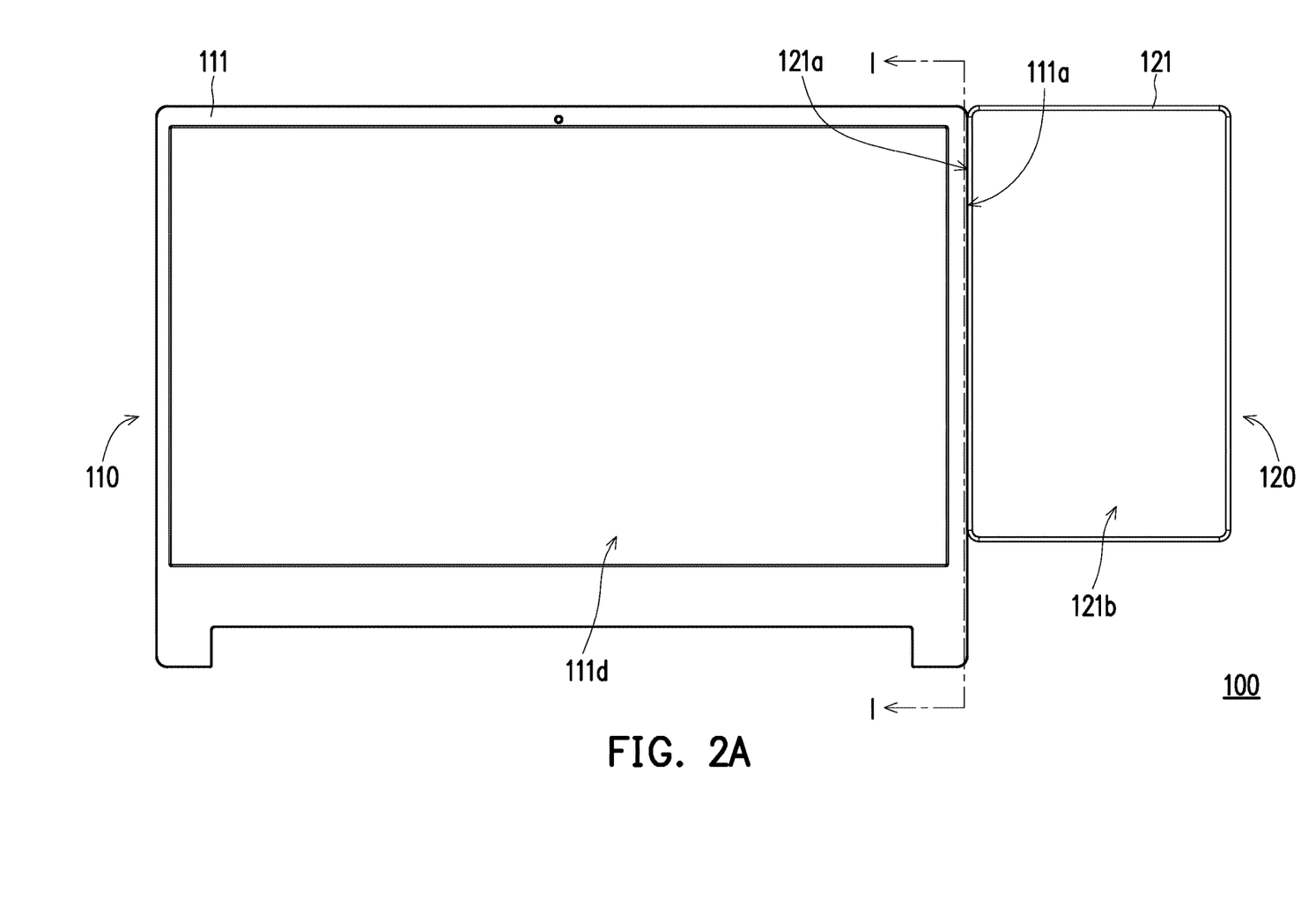
FIG. 2A is a schematic front view of the display apparatus according to an embodiment of the disclosure.
Figure 2B:
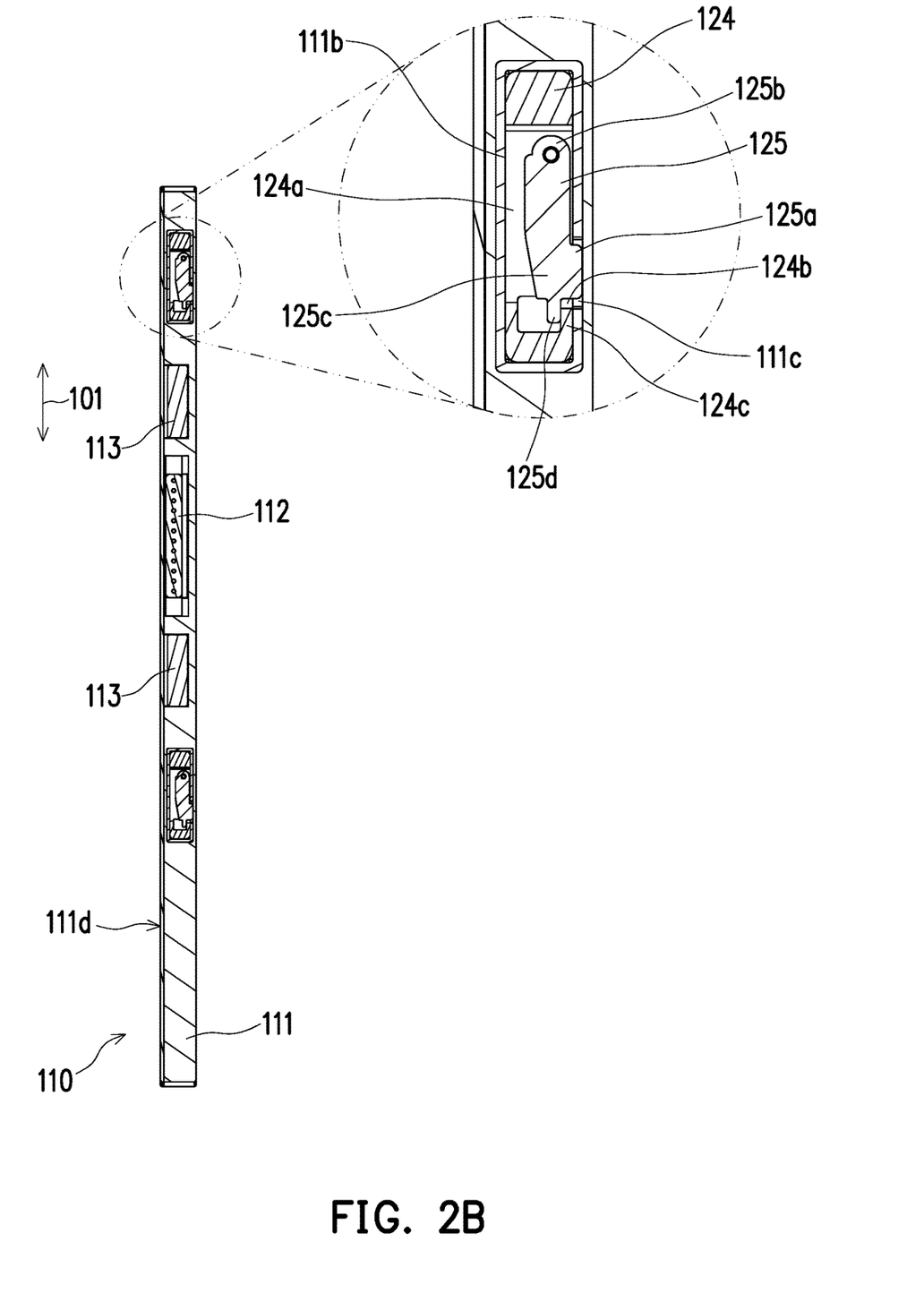
FIG. 2B is a schematic cross-sectional enlargement view taken along a cross-sectional line I-I of FIG. 2A.
Figure 3A:
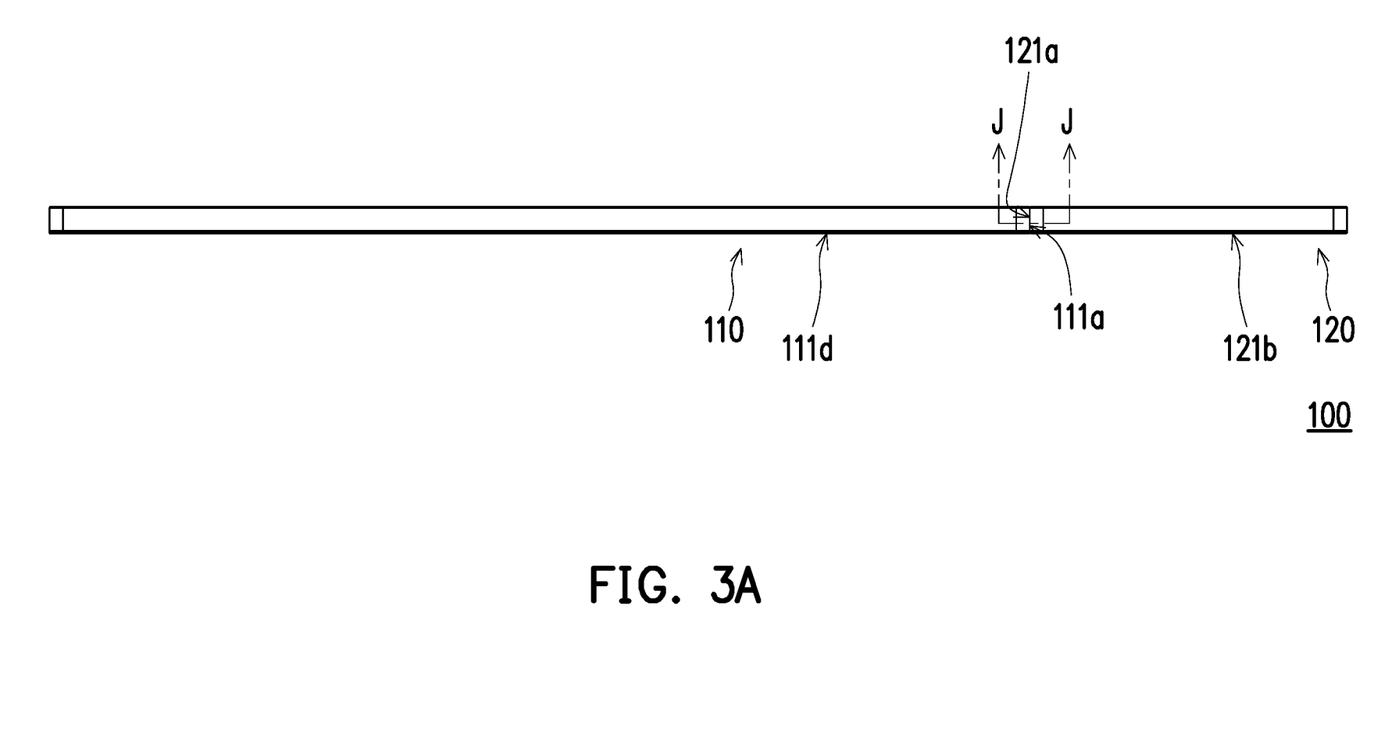
FIG. 3A is a schematic top view of the display apparatus of FIG. 2A.
Figure 3B:
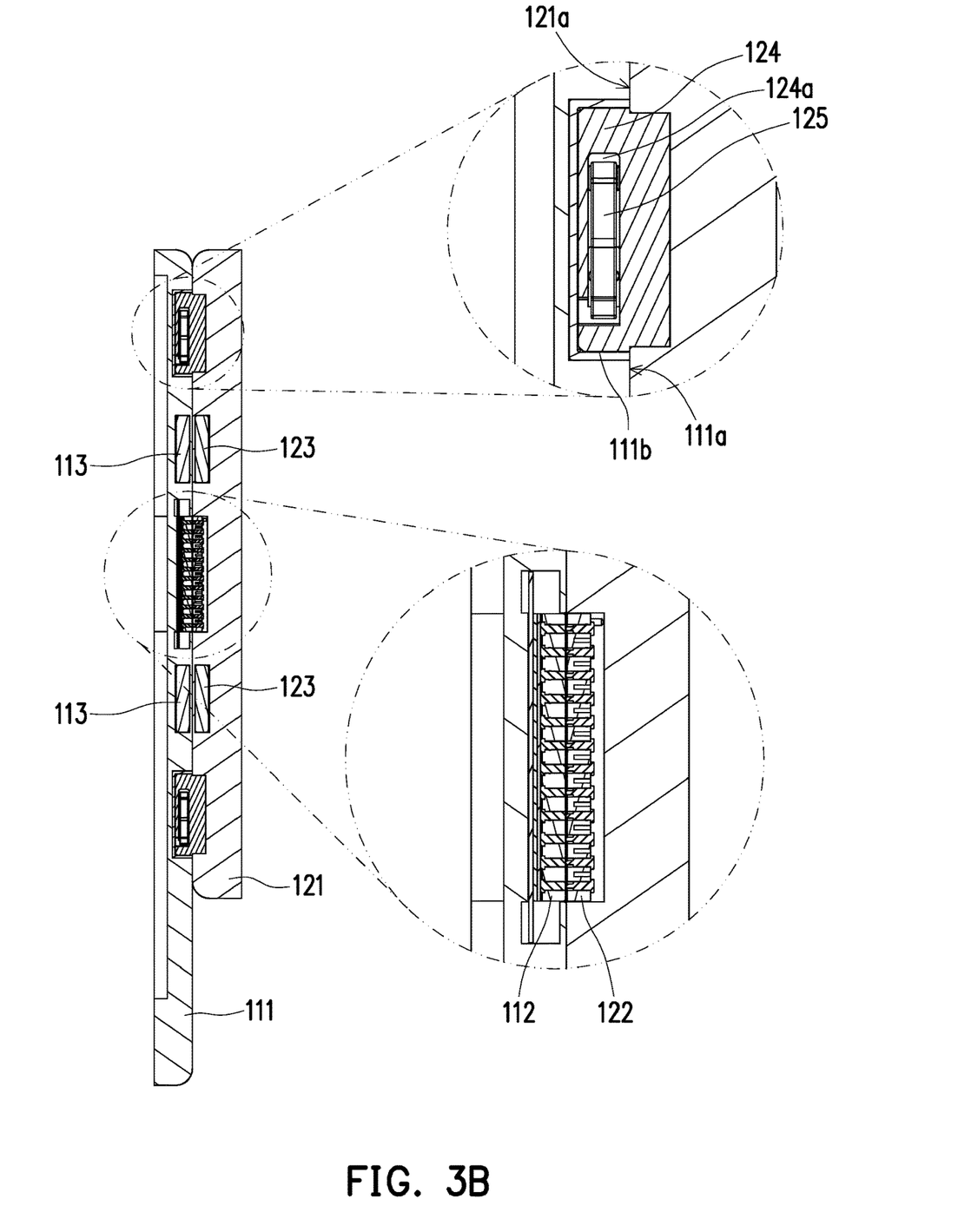
FIG. 3B is a schematic cross-sectional enlargement view taken along a cross-sectional line J-J of FIG. 3A.

FIG. 2A is a schematic front view of the display apparatus according to an embodiment of the disclosure. FIG. 2B is a schematic cross-sectional enlargement view taken along a cross-sectional line I-I of FIG. 2A. FIG. 3A is a schematic top view of the display apparatus of FIG. 2A. FIG. 3B is a schematic cross-sectional enlargement view taken along a cross-sectional line J-J of FIG. 3A. With reference to FIG. 2A and FIG. 3A, when the second display 120 is mounted at one side of the first display 110, the second side 121*a* of the second display body 121 contacts the first side 111*a* of the first display body 111.

With reference to FIG. 2B and FIG. 3B, as each second magnet 123 is matched with the corresponding first magnet 113 and each positioning protrusion 124 is matched with the corresponding positioning recess 111*b*, the second display 120 may be mounted and positioned at one side of the first display 110 by the user. Further, based on magnetic attraction between each second magnet 123 and the corresponding first magnet 113 and structural interference between each positioning protrusion 124 and the corresponding positioning recess 111*b*, the second display 120 and the first display 110 may not be slidably detached from each other easily. That is, each second magnet 123 and the corresponding first magnet 113 may provide a guiding and position mechanism, so that mounting may be conveniently performed, and enhanced reliability is provided. Similarly, each positioning protrusion 124 and the corresponding positioning recess 111*b* may provide a guiding and positioning mechanism, so that mounting may be conveniently performed, and enhanced reliability is provided.

As shown in FIG. 3B, each positioning protrusion 124 is inserted into the corresponding positioning recess 111*b*, and the second side 121*a* of the second display body 121 contacts the first side 111*a* of the first display body 111. Besides, the second connector 122 is connected to and contacts the first connector 112, so that the second display 120 is electrically coupled to the first display 110 to perform signal or power transmission.

With reference to FIG. 2B, the engagement protrusion 125*a* of each pendulum hook 125 moves out of the corresponding cavity 124*a* and is engaged with the corresponding engagement recess 111*c* to generate structural interference, so that the second display 120 is prevented from being detached from the first display 110, and assembly reliability of the display apparatus 100 is enhanced.

With reference to FIG. 1A, FIG. 1B, and FIG. 2B, in this embodiment, the first display body 111 further includes a first display surface 111*d* connected to the first side 111*a*. Each positioning recess 111*b* has a first inner wall surface 111*e* close to the first display surface 111*d* and a second inner wall surface 111*f* away from the first display surface 111*d*. To be specific, each engagement recess 111*c* is located on the second inner wall surface 111*f* of the corresponding positioning recess 111*b*. That is, each engagement recess 111*c* is located at one side of the corresponding positioning recess 111*b* away from the first display surface 111*d*.

The second display body 121 further includes a second display surface 121*b* connected to the second side 121*a*, and each positioning protrusion 124 has an opening 124*b* communicating with the cavity 124*a*. To be specific, each opening 124*b* is located on a movement path of the corresponding engagement protrusion 125*a* and faces away from the second display surface 121*b*. Therefore, the engagement protrusion 125*a* of each pendulum hook 125 may move out of the cavity 124a or move back to the cavity 124a through the corresponding opening 124b.

With reference to FIG. 2A and FIG. 2B, the first display surface 111d is adjacent to the second display surface 121b, and the two surfaces face the same direction in space. When each positioning protrusion 124 is inserted into the corresponding positioning recess 111b, each opening 124b is aligned with the corresponding engagement recess 111c. Under the action of gravity, each pendulum hook 125 rotates (or swings) with respect to the positioning protrusion 124, so that each engagement protrusion 125a moves out of the cavity 124a through the corresponding opening 124b and is engaged with the corresponding engagement recess 111c.

Further, as a tilt angle of the second display 120 in space changes, a position of the engagement protrusion 125a of each pendulum hook 125 changes. In states shown in FIG. 2A and FIG. 2B, the first display surface 111d and the second display surface 121b are parallel to a direction of gravity 101 or are tilted backward with respect to the direction of gravity 101. Taking a notebook computer as an example, an unfolding angle of the first display 110 may be greater than or equal to 90 degrees. Under the action of gravity, the engagement protrusion 125a of each pendulum hook 125 moves out of the cavity 124a through the corresponding opening 124b and is engaged with the corresponding engagement recess 111c.

In this embodiment, each pendulum hook 125 further includes a pivoting portion 125b pivotally connected to the positioning protrusion 124 and a counterweight portion 125c connected to the engagement protrusion 125a, and the pivoting portion 125b is away from the engagement protrusion 125a and the counterweight portion 125c. That is, the center of mass of each pendulum hook 125 falls on the counterweight portion 125c and is close to the engagement protrusion 125a. When the first display surface 111d and the second display surface 121b are parallel to the direction of gravity 101 or are tilted backward with respect to the direction of gravity 101, under the action of gravity, the counterweight portion 125c of each pendulum hook 125 may drive the engagement protrusion 125a to move out of the cavity 124a through the corresponding opening 124b.

As shown in FIG. 2B, each pendulum hook 125 further includes a position limiting portion 125d, the position limiting portion 125d is connected to the counterweight portion 125c, and the engagement protrusion 125a and the counterweight portion 125c are located between the pivoting portion 125b and the position limiting portion 125d. Further, each positioning protrusion 124 has a stopping portion 124c adjacent to the opening 124b, and the position limiting portion 125d of each pendulum hook 125 is located in the corresponding cavity 124a and abuts against the stopping portion 124c. Therefore, the stopping portion 124c of each positioning protrusion 124 may be configured to determine a rotation (or swing) range of the corresponding pendulum hook 125, so that most of the blocks of the pendulum hook 125 are accommodated in the cavity 124a.

Figure 4A:
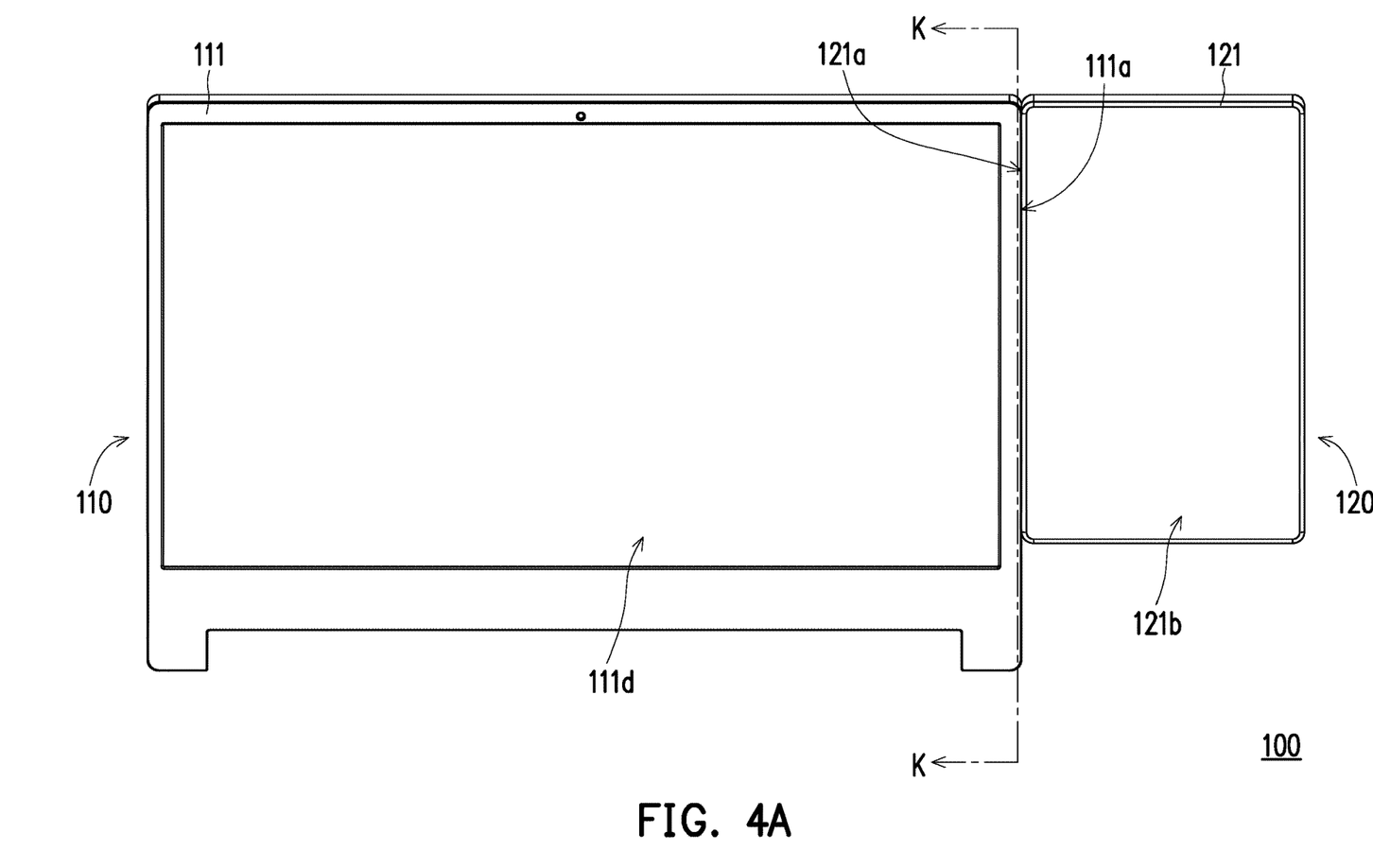
FIG. 4A is a schematic front view of the display apparatus of FIG. 2A being tilted forward.
Figure 4B:
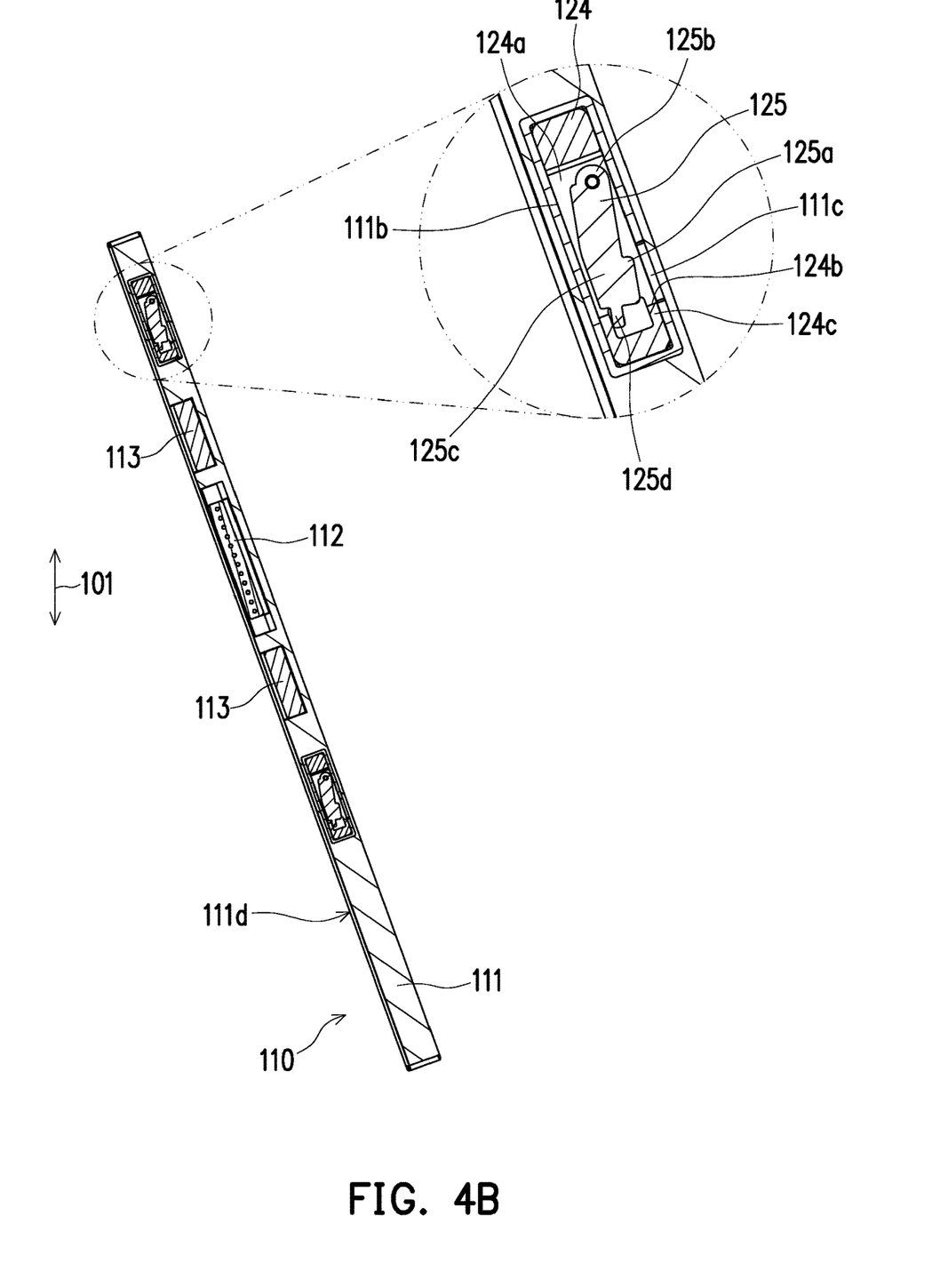
FIG. 4B is a schematic cross-sectional enlargement view taken along a cross-sectional line K-K of FIG. 4A.

FIG. 4A is a schematic front view of the display apparatus of FIG. 2A being tilted forward. FIG. 4B is a schematic cross-sectional enlargement view taken along a cross-sectional line K-K of FIG. 4A. In FIG. 4A and FIG. 4B, the first display surface 111d and the second display surface 121b are not parallel to the direction of gravity 101 and are tilted forward with respect to the direction of gravity 101. Taking a notebook computer as an example, the unfolding angle of the first display 110 may be less than or equal to 70 degrees. Under the action of gravity, the engagement protrusion 125a of each pendulum hook 125 moves away from the corresponding engagement recess 111c and moves back to the cavity 124a through the corresponding opening 124b. At this time, the position limiting portion 125d of each pendulum hook 125 is separated from the stopping portion 124c.

After the structural interference between the engagement protrusion 125a of each pendulum hook 125 and the corresponding engagement recess 111c is lifted, the second display 120 may be detached from the first display 110 by the user, so that detaching and mounting may be easily performed.

In view of the foregoing, in the display apparatus provided by the disclosure, as the positioning protrusion is matched with the positioning recess and the second magnet is matched with the first magnet, the second display may be mounted at one side of the first display by the user, and the second display is also prevented from being slidably detached from the first display. Further, after the positioning protrusion is inserted into the positioning recess, and the second side of the second display body contacts the first side of the first display body. When the pendulum hook is subjected to the action of gravity so that engagement protrusion is engaged with the engagement recess, structural interference is generated between the engagement protrusion and the engagement recess, so that the second display is accordingly prevented from being detached from the first display, and assembly reliability of the display apparatus is enhanced. In contrast, when the pendulum hook is subjected to the action of gravity so that the engagement protrusion moves out of the engagement recess, the structural interference between the engagement protrusion and the engagement recess is lifted, and that the second display may be detached from the first display by the user, and easy detaching and mounting is provided.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display apparatus, comprising:
   a first display, comprising a first display body, the first display body having a positioning recess and an engagement recess located in the positioning recess; and
   a second display, detachably mounted at one side of the first display body, wherein the second display comprises a second display body, a positioning protrusion, and a pendulum hook, and the positioning protrusion protrudes from the second display body, wherein the pendulum hook is pivotally connected to the positioning protrusion, and the pendulum hook has an engagement protrusion,
   wherein the positioning protrusion is inserted into the positioning recess, and the second display body contacts first display body,
   wherein the engagement protrusion of the pendulum hook is configured to rotate with respect to the positioning protrusion and thus being engaged with the engagement recess or move away from the engagement recess.

2. The display apparatus according to claim 1, wherein the first display body further comprises a first display surface connected to a first side, the positioning recess has a first inner wall surface close to the first display surface and a second inner wall surface away from the first display surface, and the engagement recess is located on the second inner wall surface.

3. The display apparatus according to claim 1, wherein the second display body further comprises a second display surface connected to a second side, and the positioning protrusion has a cavity configured to accommodate the pendulum hook and an opening communicating with the cavity, the opening faces away from the second display surface, and the engagement protrusion of the pendulum hook moves out of the cavity or moves back to the cavity through the opening.

4. The display apparatus according to claim 1, wherein the pendulum hook further comprises a pivoting portion pivotally connected to the positioning protrusion and a counterweight portion connected to the engagement protrusion, and the pivoting portion is away from the engagement protrusion and the counterweight portion.

5. The display apparatus according to claim 4, wherein the pendulum hook further comprises a position limiting portion, the position limiting portion is connected to the counterweight portion, the engagement protrusion and the counterweight portion are located between the pivoting portion and the position limiting portion, the positioning protrusion has a cavity configured to accommodate the pendulum hook and an opening communicating with the cavity and a stopping portion close to the opening, and the position limiting portion is located in the cavity and abuts against or is separated from the stopping portion.

6. The display apparatus according to claim 1, wherein the first display further comprises a first connector, and the first connector and the positioning recess are disposed at a same side of the first display body, the second display further comprises a second connector disposed, and the second connector and the positioning protrusion are disposed at a same side of the second display body, wherein the second connector is connected to the first connector.

7. The display apparatus according to claim 6, wherein a number of the positioning recess is two, and the first connector is located between the two positioning recesses.

8. The display apparatus according to claim 6, wherein a number of the positioning protrusion is two, and the second connector is located between the two positioning protrusions.

9. The display apparatus according to claim 8, wherein a number of the pendulum hook is two, and one of the pendulum hooks and one of the positioning protrusions are arranged into a group.

10. The display apparatus according to claim 1, wherein the first display further comprises a first magnet, and the first magnet and the positioning recess are disposed at a same side of the first display body, the second display further comprises a second magnet, and the second magnet and the positioning protrusion are disposed at a same side of the second display body, wherein the second display body contacts the first display body, and the second magnet is magnetically attracted to the first magnet.

* * * * *